(12) United States Patent
Ali et al.

(10) Patent No.: US 8,279,259 B2
(45) Date of Patent: Oct. 2, 2012

(54) MIMICKING HUMAN VISUAL SYSTEM IN DETECTING BLOCKINESS ARTIFACTS IN COMPRESSED VIDEO STREAMS

(75) Inventors: Walid S. I. Ali, Sammamish, WA (US); Rony Ferzli, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 12/566,590

(22) Filed: Sep. 24, 2009

(65) Prior Publication Data

US 2011/0069138 A1     Mar. 24, 2011

(51) Int. Cl.
*H04N 7/14* (2006.01)
(52) U.S. Cl. .................. 348/14.08; 348/14.1; 348/14.12
(58) Field of Classification Search .... 348/14.01–14.16; 375/240.24, 240.26, 240.29, 240.08; 382/266, 382/199, 260, 309
See application file for complete search history.

(56) References Cited

U.S. PATENT DOCUMENTS

| | | | |
|---|---|---|---|
| 6,320,905 B1* | 11/2001 | Konstantinides | 375/240.08 |
| 6,437,821 B1 | 8/2002 | Janko et al. | |
| 7,003,174 B2 | 2/2006 | Kryukov et al. | |
| 2002/0006231 A1* | 1/2002 | Jayant et al. | 382/266 |
| 2002/0009146 A1* | 1/2002 | Hall et al. | 375/240.24 |
| 2004/0114685 A1* | 6/2004 | Kouloheris et al. | 375/240.03 |
| 2007/0071356 A1 | 3/2007 | Caviedes et al. | |
| 2007/0206871 A1 | 9/2007 | Jalil et al. | |
| 2007/0263897 A1* | 11/2007 | Ong et al. | 382/100 |
| 2008/0247664 A1 | 10/2008 | Lee et al. | |
| 2009/0147854 A1 | 6/2009 | Dane et al. | |
| 2009/0208140 A1* | 8/2009 | Jayant et al. | 382/309 |

FOREIGN PATENT DOCUMENTS

WO     2007130389 A2     11/2007

OTHER PUBLICATIONS

Babu, et al., "Evaluation and Monitoring of Video Quality for UMA Enabled Video Streaming Systems", Retrieved at <<http://www.q2s.ntnu.no/~venkat/mta294.pdf>>, pp. 1-24.
Winkler, et al., "Perceptual Video Quality and Blockiness Metrics for Multimedia Streaming Applications", Retrieved at <<http://stefan.winkler.net/Publications/wpmc2001.pdf>>, pp. 4.
Muijs, et al., "Quality-Adaptive Sharpness Enhancement Based on a No-Reference Blockiness Metric", Retrieved at <<http://enpub.fulton.asu.edu/resp/vpqm2006/papers06/260.pdf>>, pp. 5.
"Final Report from the Video Quality Experts Group on the Validation of Objective Models of Video Quality Assessment", Retrieved at <<http://www.its.bldrdoc.gov/vqeg/projects/frtv_phaseI/COM-80E_final_report.pdf>>, Telecommunication Standardization Sector, Jun. 2000, pp. 125.

(Continued)

*Primary Examiner* — Melur Ramakrishnaiah
(74) *Attorney, Agent, or Firm* — Turk IP Law, LLC (57) ABSTRACT

A low complexity block-based, no-reference objective blockiness metric is provided that may be combined with other artifact metrics to measure overall quality of received video stream in a video conferencing application such that measures can be taken at the transmitter or in post-processing to enhance video quality. Prior knowledge of the blockiness boundaries may be used to reduce number of computations in determining the blockiness of a particular video frame.

20 Claims, 10 Drawing Sheets

OTHER PUBLICATIONS

Babu, et al., "Evaluation and Monitoring of Video Quality for UMA Enabled Video Streaming Systems", Retrieved at <<http://www.serc.iisc.ernet.in/~venky/Papers/rvb_mta08.pdf>>, In journal of multimedia tools and applications, vol. 37, No. 2, Apr. 2008, pp. 1-24.

Winkler, et al., "Perceptual Video Quality and Blockiness Metrics for Multimedia Streaming Applications", Retrieved at <<http://stefan.winkler.net/Publications/wpmc2001.pdf>>, In proceedings of the international symposium on wireless personal multimedia communications, Sep. 9-12, 2001, pp. 4.

Muijs, et al., "Quality-Adaptive Sharpness Enhancement Based on a No-Reference Blockiness Metric", Retrieved at <<http://enpub.fulton.asu.edu/resp/vpqm2006/papers06/260.pdf>>, In proceedings of 2nd International workshop on video processing and quality metrics consumer electronics, Jan. 2006, pp. 5.

* cited by examiner

MIMICKING HUMAN VISUAL SYSTEM IN DETECTING BLOCKINESS ARTIFACTS IN COMPRESSED VIDEO STREAMS

BACKGROUND

Videoconferencing uses telecommunications of audio and video to bring people at different sites together for a meeting. This can be as simple as a conversation between two people in private offices (point-to-point) or involve several sites (multipoint) with more than one person in a number of rooms at different sites. Besides the audio and visual transmission of people, videoconferencing can be used to share documents, computer-displayed information, and whiteboards.

In video conferencing applications, many users may share the same channel. Due to channel sharing and limited bandwidth availability, video compression is performed using state of the art video encoding algorithms. To accommodate as many users as possible, an acquired video is typically highly compressed. Due to the compression, a decoded video tends to introduce visually annoying artifacts such as blurring, ringing, and blockiness.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a low complexity block-based no-reference objective blockiness metric that may be combined with other artifact metrics to measure overall quality of received video stream in a video conferencing application. According to some embodiments, priori knowledge of the blockiness boundaries may be used to reduce number of computations in determining the blockiness of a particular video frame.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a block-based no-reference metric may be employed to measure blockiness artifacts in received video streams in order to enhance video quality. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for facilitating video conferences. Examples of platforms include, but are not limited to, a hosted service executed over a plurality of servers, an application executed on a single server, and comparable systems. The term "server" refers to a computing device executing one or more software programs typically in a networked environment. The term "client" refers to a computing device or software application that provides a user access to data and other software applications through a network connection with other clients and/or servers. More detail on these technologies and example operations is provided below.

Figure 1:
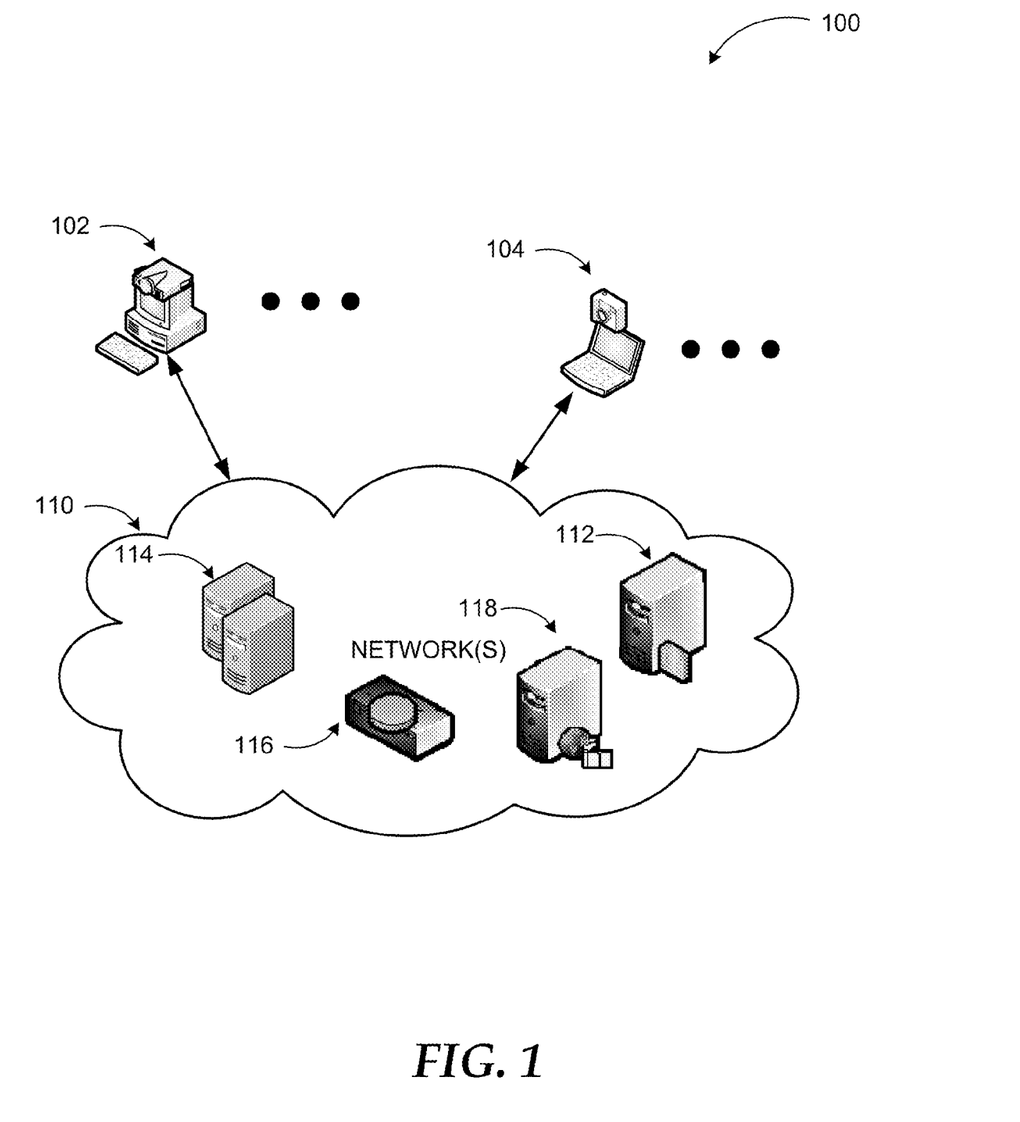
FIG. 1 is a diagram illustrating an example video conferencing system.

Referring to FIG. 1, diagram 100 of an example video conferencing system is illustrated. At the core of a video conferencing system is a network (e.g. network(s) 110) enabling a number of participants with audio/video transmission and reception capability to communicate with each other as a group. Participant devices 102, 104 may be any computing device with audio/video capability such as desktop or laptop computers with a camera and microphone (as well as a speaker), specialized video conferencing equipment, or even mobile devices with audio/video capabilities.

Network 110, as discussed in more detail below, may be any communication network or combination of networks. The video conference may be facilitated by a single device/program or by a combination of devices and programs. For example, audio/video server 118, firewall server 112, or mediation servers 114 may be involved with different aspects of the conference such as storage and processing of audio/video files, security, or interconnection of various networks for seamless communication. Any of these example tasks and others may be performed by software programs, hardware devices, and/or combination of the two.

According to one embodiment, MCU 116 may be the main facilitator of the video conference in coordination with one or more of the other devices and/or programs mentioned. MCU 116 may use various protocols such as Internet Protocol (IP), and be structured as software program(s), hardware, or combination of the two. MCU 116 may be a stand-alone hardware device, or it may be embedded into dedicated conferencing devices (e.g. audio/video server 118 or mediation servers 114). Furthermore, MCU 116 may be structured as a "decentralized multipoint", where each station in a multipoint call exchanges video and audio directly with the other stations with no central manager or other bottleneck.

As mentioned previously, an MCU controlled video conference may support receiving one video stream with fix resolution or receiving multiple video streams with different resolutions. MCU 116 may support, in addition to regular video conferences, multi-party conferences that escalate from a peer-to-peer chat through a mesh network.

Participants in the video conference such as the end devices and the MCU 116 may communicate also through Session Description Protocol (SDP), which is a format for describing streaming media initialization parameters. SDP is intended for describing multimedia sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats enabling systems based on this technology to be forward compatible.

Centralized Conferencing Control Protocol (CCCP) may also be employed to facilitate video conferences between the participants. CCCP uses a client-server model for creation, querying, and manipulation of conference system entities, conference objects, and sub-objects. By implementing a CCCP server, a means is provided for authorized CCCP clients (e.g. conference participants) to affect the behavior of a conference. CCCP is a semantic oriented protocol, which uses extensible markup language (XML) types defined in the conference data package for the representation of conference object and its sub-objects. Thus, the CCCP approach defines a set of semantics (e.g. add, get, set, delete, remove) that operate directly on the conference state elements.

By measuring the strength of visual artifacts in video conferencing applications, the metrics may be used to access automatically without human intervention the quality of the video frames and as a feedback parameter to the transmitter to increase, for example, the encoding bit rate or to modify the post processing algorithms at the decoder to adjust the filtering strength. The measurements of various degradations may later be combined to generate an overall objective quality metric, according to the perceptual impact of each one of the impairments.

Figure 2:
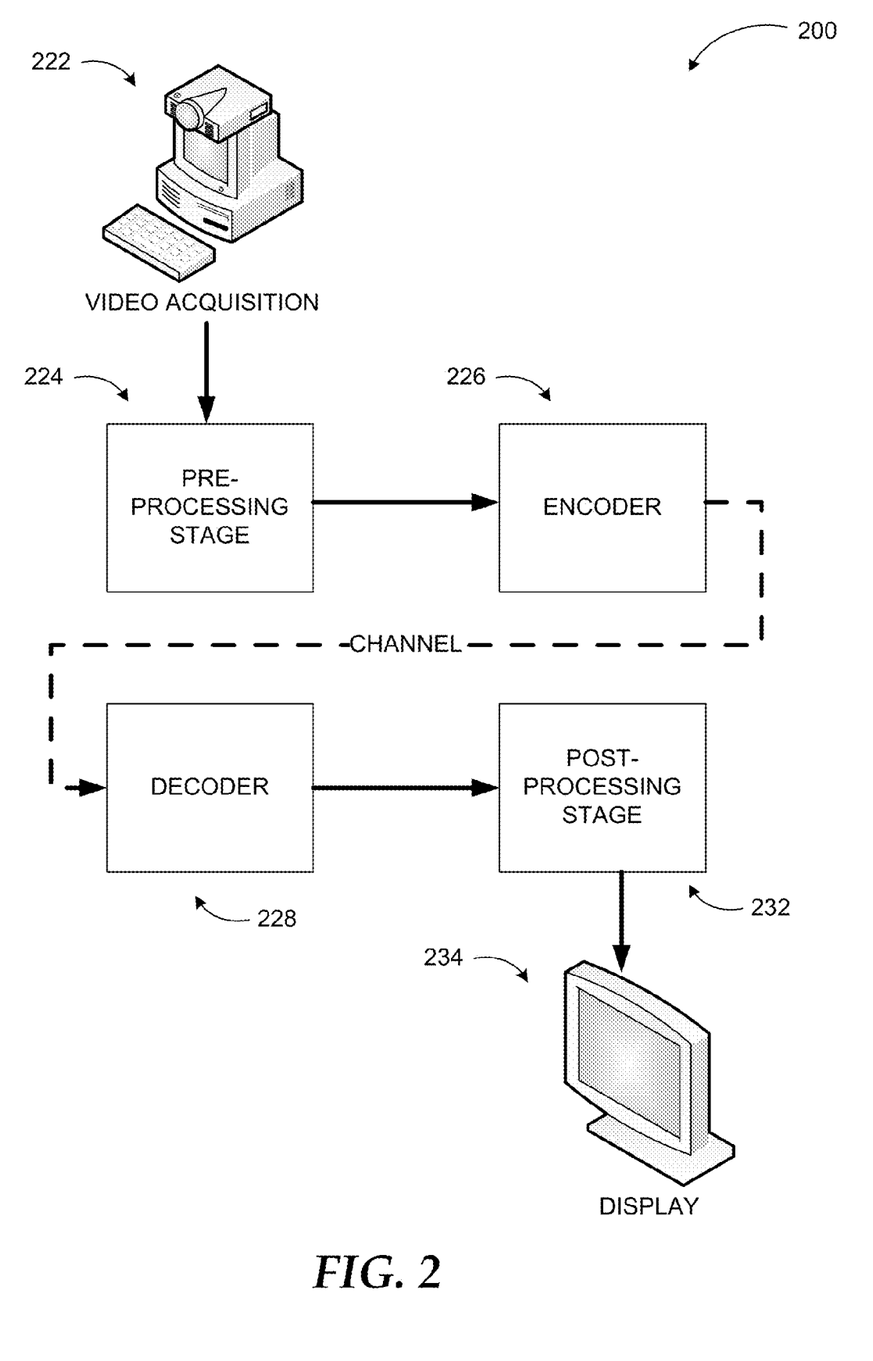
FIG. 2 illustrates major components in video exchange between participants of a video conferencing system.

FIG. 2 illustrates major components in video exchange between participants of a video conferencing system (200). A video conferencing system essentially captures video and audio from one or more sources, processes the signals, converts them to digital signals, transmits to one or more recipients, enables further processing of the digitized information at the recipient device(s), and enables presentation of the captured video and audio to a user at the recipient device(s). Modern video conferencing systems use available communication networks including the Internet and are capable of facilitating video conferences between large numbers of participants. Thus, transmitted data is typically compressed and otherwise minimized in order to be able to reduce necessary bandwidth, accommodate as many participants as possible, accommodate advanced features such as multiple streams, and so on. Therefore, captured signals and received signals are processed using various algorithms at the transmitting source and recipient, respectively.

Video (and audio) acquisition takes place at the source device 222 using a capture device such as a digital camera, a webcam, or similar devices. Capabilities of video capture devices may vary significantly. Therefore, the processing of the signal at pre-processing stage 224 may also vary. This stage preceding encoding of the signal to digital signal is aimed at enhancing the acquired video and reducing the complexity of the overall system (for example, for adjusting/optimizing brightness, contrast, noise reduction, scaling, and comparable characteristics).

Encoder 226 at the source and decoder 228 at the recipient encode and decode, respectively, the pre-processed signal using standard or custom algorithms. Post-processing stage 232 is the last stage before the video is displayed to a user at the recipient device and is mainly responsible for enhancing the decoded video signal. Various filtering, adjustment algorithms may be applied at the post-processing stage 232. The post-processed signal is then displayed on a display device 234 (e.g. a desktop monitor, a projector, a portable monitor, etc.).

As mentioned above, various artifacts may be introduced to the video signal due to characteristics and shortcomings of the capture device, encoding methods, transmission medium (e.g. bandwidth), etc. In a system according to embodiments, a blockiness metric may be computed at the post-processing stage and employed along with other metrics to enhance the perceived quality of the displayed video by providing feedback to other components of the system to adjust their operations.

Figure 3:
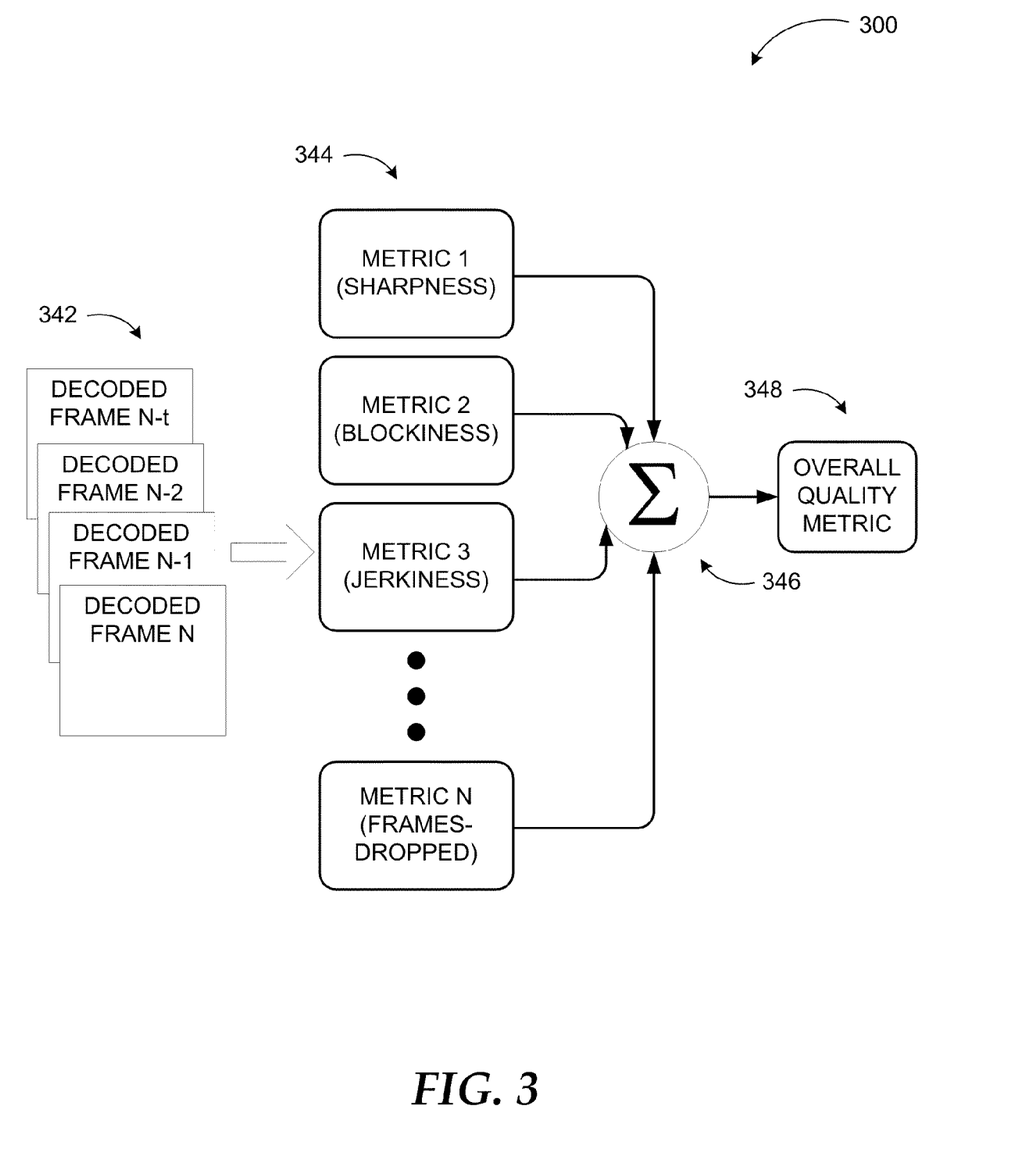
FIG. 3 illustrates use of example metrics in determining an overall quality metric for received video frames in a system according to embodiments.

FIG. 3 illustrates use of example metrics in determining an overall quality metric for received video frames in a system according to embodiments. Human perception of the quality of received video depends on a number of factors based on a variety of artifacts introduced into the video at different stages. For example, sharpness of the images (especially along edges), blockiness (appearance of block edges), jerkiness (slight but detectable movements of various portions of the images), dropped video frames during transmission, and other factors may degrade the quality of the received video.

A video stream in a video conferencing system (and other systems) is formed by individual video frames. Thus, in a system according embodiments, each decoded frame 342 may be used to determine a number of distinct metrics 344 based on various characteristics of the decoded video addressing different aspects of video quality. These metrics 344 may then be combined (346) yielding an overall quality metric 348 as shown in diagram 300.

Individual metrics such as sharpness metric, blockiness metric, jerkiness metrics, etc. may be used to provide feedback to different components of the system (pre-processing, encoder, post-processing, etc.) to adjust operational parameters such as increasing transmission bit rate or filtering strength in order to enhance received video quality. On the other hand, the overall quality metric 348 may also be used to notify transmission source or other components of the system (including post-processing stage) that some operational parameters need to be changed to enhance video quality in an objective and automated fashion.

Figure 4:
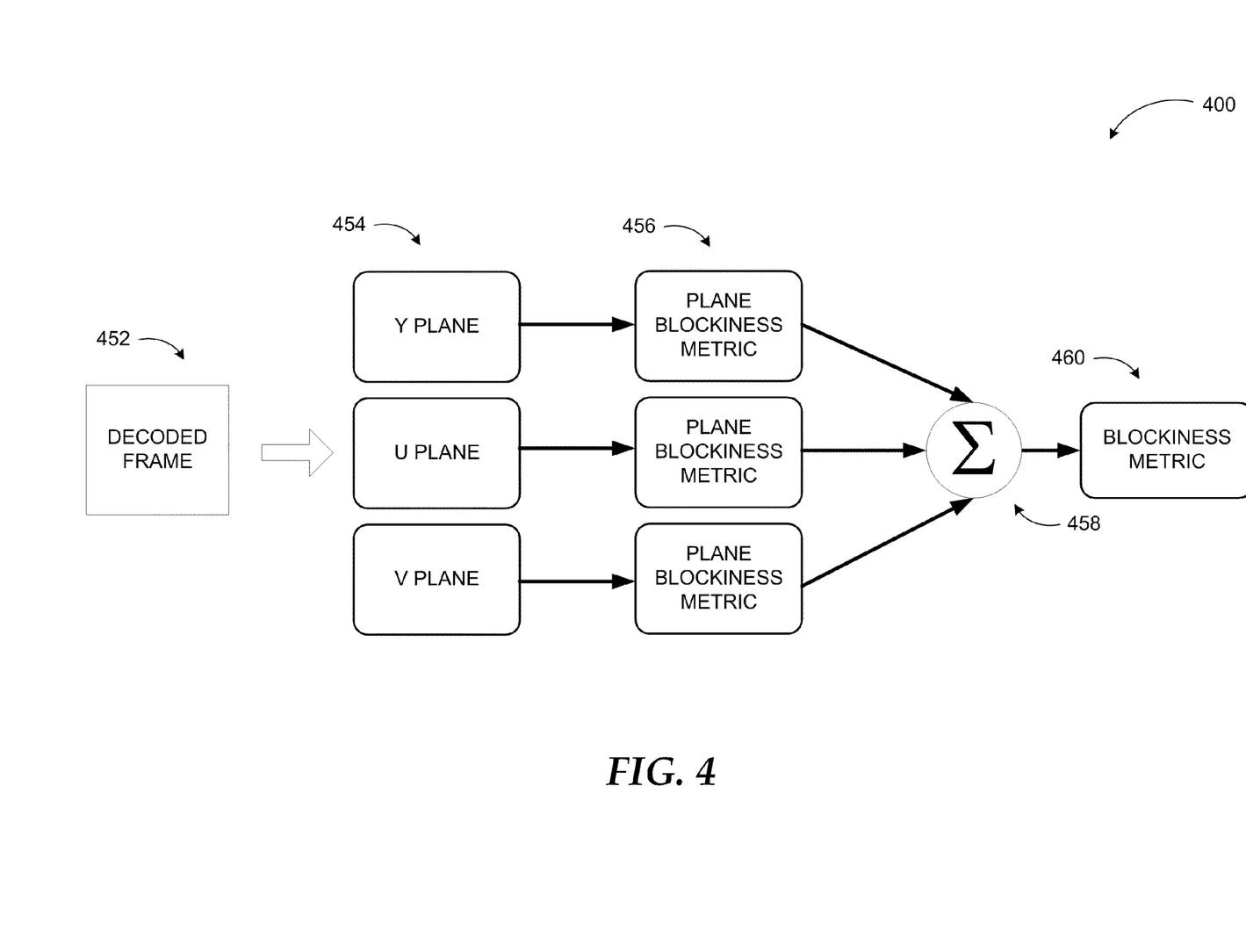
FIG. 4 illustrates how a blockiness metric may be determined using Y, U, and V planes according to one embodiment.

FIG. 4 illustrates how a blockiness metric may be determined using Y, U, and V planes according to one embodiment. One of the artifacts that may cause degradation in the video quality is blockiness. Pixels within a video frame are commonly processed and displayed in blocks. Blockiness is caused by data compression and is especially visible along edge blocks. When an edge block (e.g. 8×8) location is consistent at interval of 8 as discussed below. Thus, the autocorrelation value of the cross-sectioned vector (i.e. row) compared to the cross-correlation value between the row and its shifted version is an indication of blockiness. A ratio of the autocorrelation versus cross-correlation is employed to compute the blockiness metric in a system according to embodiments.

According to one embodiment, individual blockiness metrics 456 may be computed for each of the Y, U, and V planes 454 of the decoded frame 452 and then the three metrics combined (458) by averaging them with weighting factors (e.g. ½ for Y plane, ¼ for U plane, and ¼ for V plane) to arrive at the blockiness metric 460 for the decoded frame 452.

Y, U, and V planes are defined for YUV color space, which typically used as part of a color image pipeline. Color images or video are encoded in the YUV color space taking human perception into account and allowing reduced bandwidth for chrominance components, thereby typically enabling transmission errors or compression artifacts to be more efficiently masked by the human perception.

In addition to common TV transmission standards such as NTSC, PAL, or SECAM, the YUV color model is also used by common digital image and video file formats such as JPEG or MPEG. The YUV model defines a color space in terms of one luma (Y) and two chrominance (U and V) components. Y (the luma component) defines the brightness (luminance). U and V are the chrominance (color) components.

Figure 5:
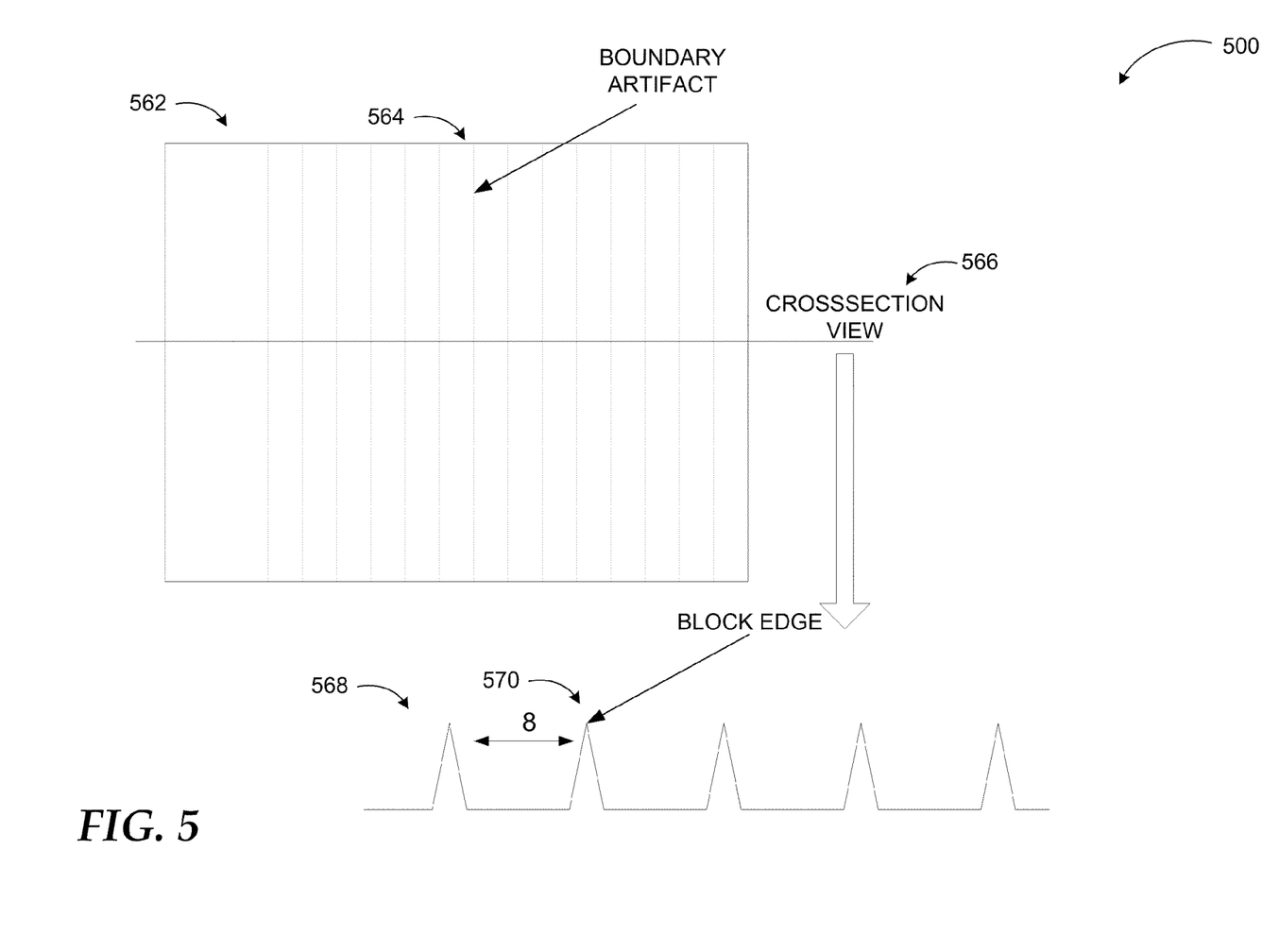
FIG. 5 illustrates how an edge block (i.e. 8×8) location is consistent at interval of 8 in the video signal.

FIG. 5 illustrates how an edge block (i.e. 8×8) location is consistent at interval of 8 in the video signal. Cross-section view 566 of a video frame 562 is shown in diagram 500 with boundary artifacts 564 due to blockiness. In a frame with 8×8 blocks, the artifact presents itself as spikes (570) in the video signal 568 corresponding to block edges consistent with an interval of 8.

As discussed previously, a ratio of the autocorrelation versus cross-correlation is employed to compute the blockiness metric in a system according to embodiments. For a decoded frame of size n×m, where n is the number of rows and m is the number of columns, the autocorrelation for each row "i" may be computed as:

$$A = \Sigma_{j=1}^{M} F(i,j) \cdot F(i,j), \quad [1]$$

and cross-correlation may be computed as:

$$C = \Sigma_{j=1}^{M} F(i,j) \cdot F(i,j\text{-offset}), \quad [2]$$

where "offset" is a measure of the shift in the row.

The blockiness metric for each row may then be defined as:

$$\text{Metric}_{row} = 1 - A/C. \quad [3]$$

After computing the metric for each row, the blockiness metric for all rows of the frame may be obtained by averaging the row metrics by:

$$Blockiness_{row} = \frac{\sum_{i=1}^{n} Metric_{row}(i)}{\text{Total number of processed rows}} \quad [4]$$

$$= \frac{\sum_{i=1}^{n} Metric_{row}(i)}{n}.$$

Same operations may be completed for the columns of the frame as:

$$Blockiness_{col} = \frac{\sum_{m=1}^{m} Metric_{col}(j)}{\text{Total number of processed col's}} \quad [5]$$

$$= \frac{\sum_{j=1}^{m} Metric_{row}(j)}{m}.$$

The overall blockiness metric for the frame is obtained as:

$$Blockiness_{frame} = \frac{Blockiness_{Row} + Blockiness_{Col}}{2}. \quad [6]$$

It should be noted that the metric is inverse proportional, meaning the blockier the frame the lower the number. Subsequently, the obtained frame blockiness metric may be adjusted to correlate well with the perceived quality.

The Human Visual System (HVS) does not evaluate quality linearly. Rather, subjective testing can have nonlinear quality rating compression at the extremes. This means when quality is very good, even if blockiness is decreased, the subjective rating may remain practically the same. Moreover, if quality is really bad and the blockiness is increased, the subjective ratings may not be affected.

To replicate the behavior of the Human Visual System a 'logistic' function may be used. For a given a set of N video sequences ($F_1, F_2, F_3, \ldots F_N$), the corresponding blockiness metrics ($B_1, B_2, B_3, \ldots B_N$) may be computed by normalizing each obtained blockiness metric by the maximum:

$$B_{max} = \max_i[B_1, B_2, B_3, \ldots B_N]. \quad [7]$$

Then, the exponential model may be obtained by:

$$B_{scaled}(i) = 5 \frac{E(i)}{E_{max}}, \quad [8]$$

where "i" is the frame number and E(i) is the exponential model defined as:

$$E(i) = \exp\left(\frac{8 * B(i)}{B_{max}}\right), \quad [9]$$

such that $$E_{max} = \max_i [E_1, E_2, E_3, \ldots E_N]. \quad [10]$$

This way, the exponential model is based on a maximum blockiness metric among a predefined number of decoded video frames and it has a defined lower limit and a defined upper limit (e.g. 1 and 5 if the above described example model is applied).

Figure 6:
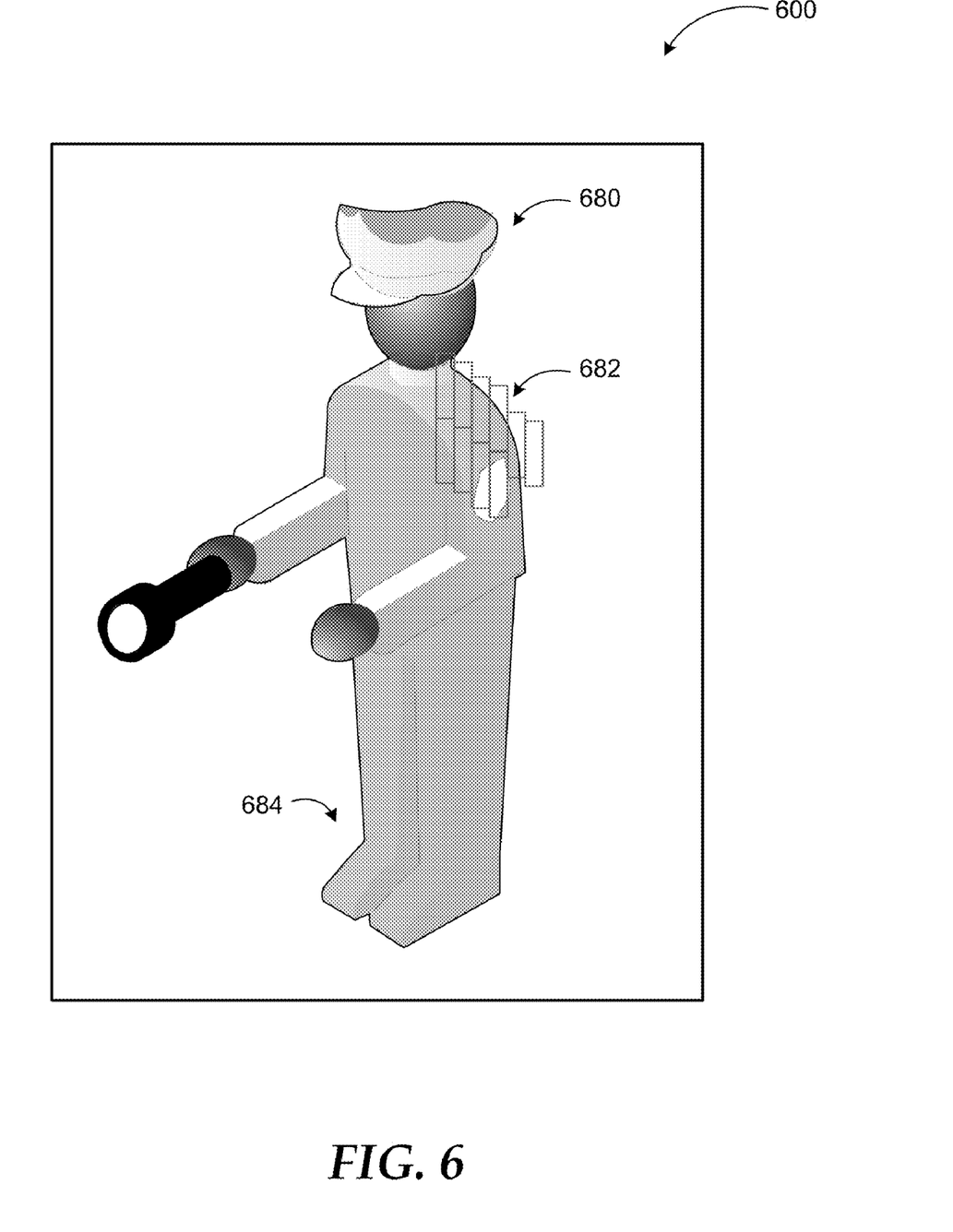
FIG. 6 illustrates an example video frame with blockiness effects.

FIG. 6 illustrates an example video frame with blockiness effects. Blockiness is not necessarily perceived equally throughout the frame. As shown in the example frame of diagram 600, regions 680 and 684 of the image do not show perceivable blockiness. On the other hand, blockiness artifacts are visible in region 682. The blockiness metric for this frame may be a low one (e.g. 2).

Figure 7:
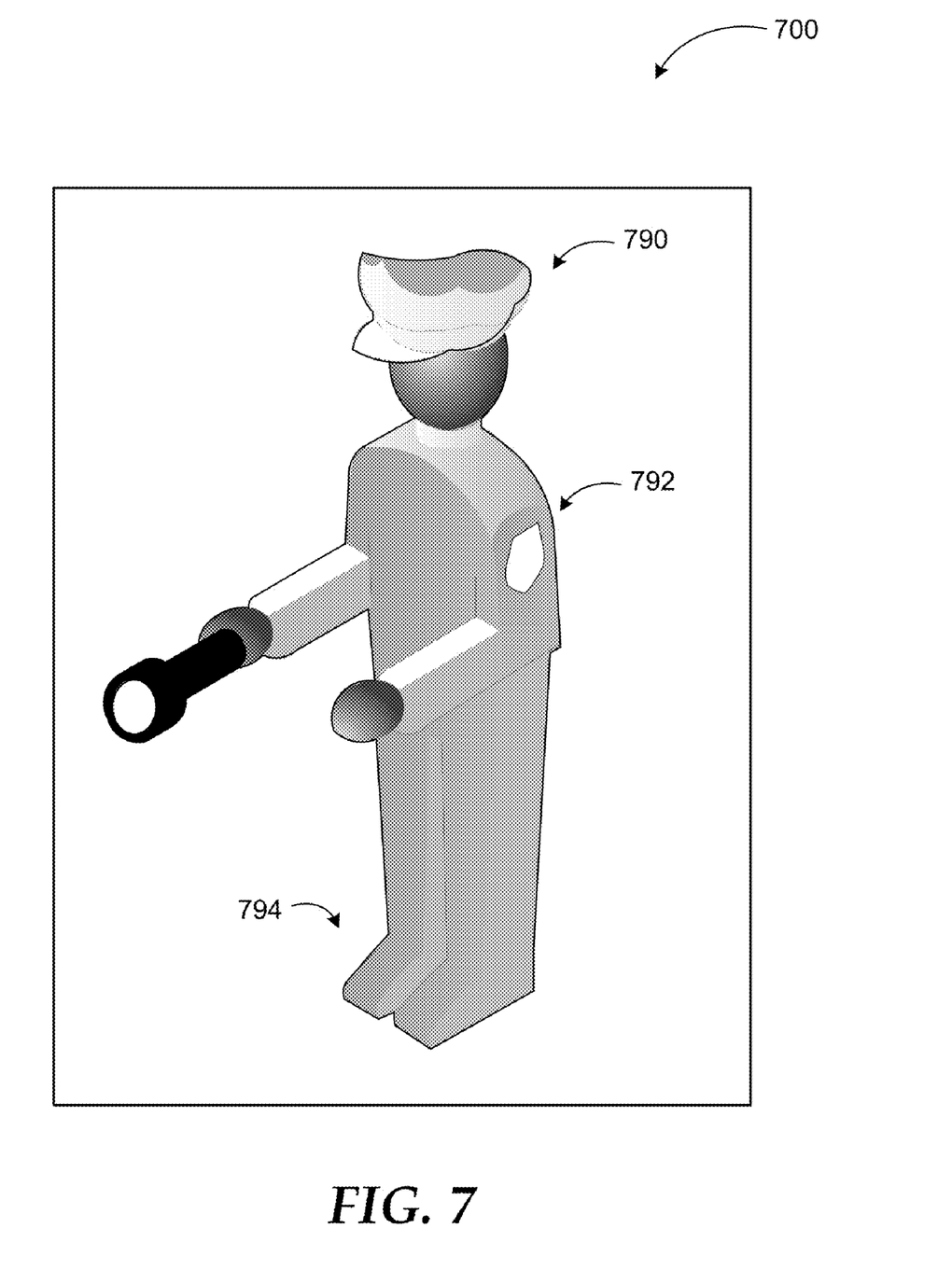
FIG. 7 illustrates the example video frame of FIG. 6 with the blockiness effects removed using a blockiness metric according to embodiments.

FIG. 7 illustrates the example video frame of FIG. 6 with the blockiness effects removed using a blockiness metric according to embodiments. The quality of the image may be improved by, among other things, increasing bit rate (i.e. providing more information). For example, the image in diagram 600 of FIG. 6 may be coded at 300 kbits/s and result in the blockiness metric of 2.

As shown in diagram 700, all three regions of interest (790, 792, and 794) do not appear to have perceivable blockiness artifacts. This example image may be coded at 8400 kbits/s and have a blockiness metric of 5. Thus, the blockiness metric may be used to instruct the encoder to use a higher bit rate in order to improve video quality. As mentioned previously, other operational parameters such as filtering strength, etc. may also be modified in response to a blockiness metric that is below a predefined threshold enabling the system to make quality adjustments objectively and automatically.

While the example systems and frames in FIG. 2 through FIG. 7 have been described with specific components, elements, and graphical aspects, embodiments are not limited to these configurations and can be implemented with other elements and configurations. Furthermore, embodiments are not limited to multi-point video conference systems. Use of blockiness metric in objectively and automatically enhancing video quality may be employed in any digital video transmission system. Moreover, the formulas listed above for computing blockiness metrics such as exponential model and example weighting factors are not to be construed as limiting embodiments. Other approaches may be employed to compute a blockiness metric using the principles described herein.

Figure 8:
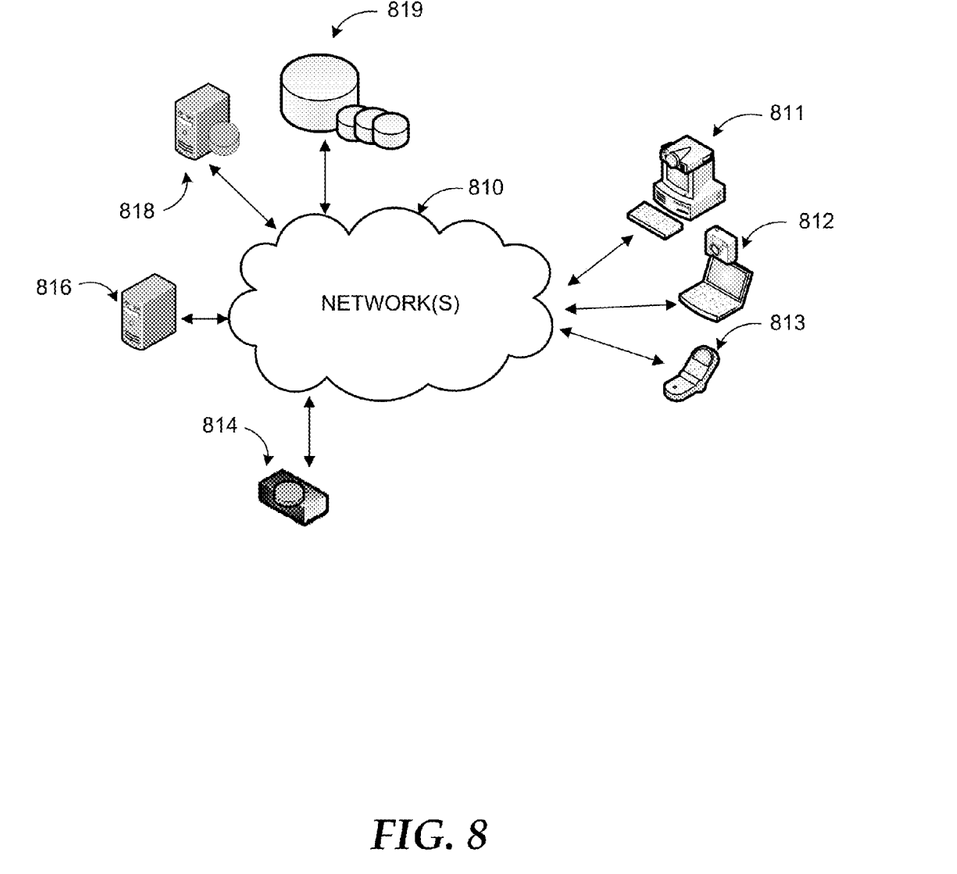
FIG. 8 is a networked environment, where a system according to embodiments may be implemented.

FIG. 8 is an example networked environment, where embodiments may be implemented. A platform providing video conferencing services may be implemented via software executed over one or more servers (e.g. server 816) such as a hosted service. A video conference may also be managed by an MCU (814) as discussed previously. The platform may communicate with video conferencing applications on individual computing devices such as a desktop computer 811, laptop computer 812, and cellular phone 813 ('client devices') through network(s) 810.

As discussed previously, client devices 811-813 are capable of communicating through a variety of modes between subscribers of a communication service. A video conferencing application executed in one of the client devices, one of the servers (e.g. server 816), or the MCU 814 may store and retrieve data associated with the video conference to and from a number of sources such as data store 819, which may be managed by any one of the servers or by database server 818. Quality metrics such as a blockiness metric may then be computed at the receiving client and results employed to enhance video quality for the receiving participant.

Network(s) 810 may comprise any topology of servers, clients, Internet service providers, and communication media. A system according to embodiments may have a static or dynamic topology. Network(s) 810 may include a secure network such as an enterprise network, an unsecure network such as a wireless open network, or the Internet. Network(s) 810 may also comprise a plurality of distinct networks. Network(s) 810 provides communication between the nodes described herein. By way of example, and not limitation, network(s) 810 may include wireless media such as acoustic, RF, infrared and other wireless media.

Many other configurations of computing devices, applications, data sources, and data distribution systems may be employed to implement a video conferencing system employing blockiness metric to enhance video quality. Furthermore, the networked environments discussed in FIG. 8 are for illustration purposes only. Embodiments are not limited to the example applications, modules, or processes.

Figure 9:
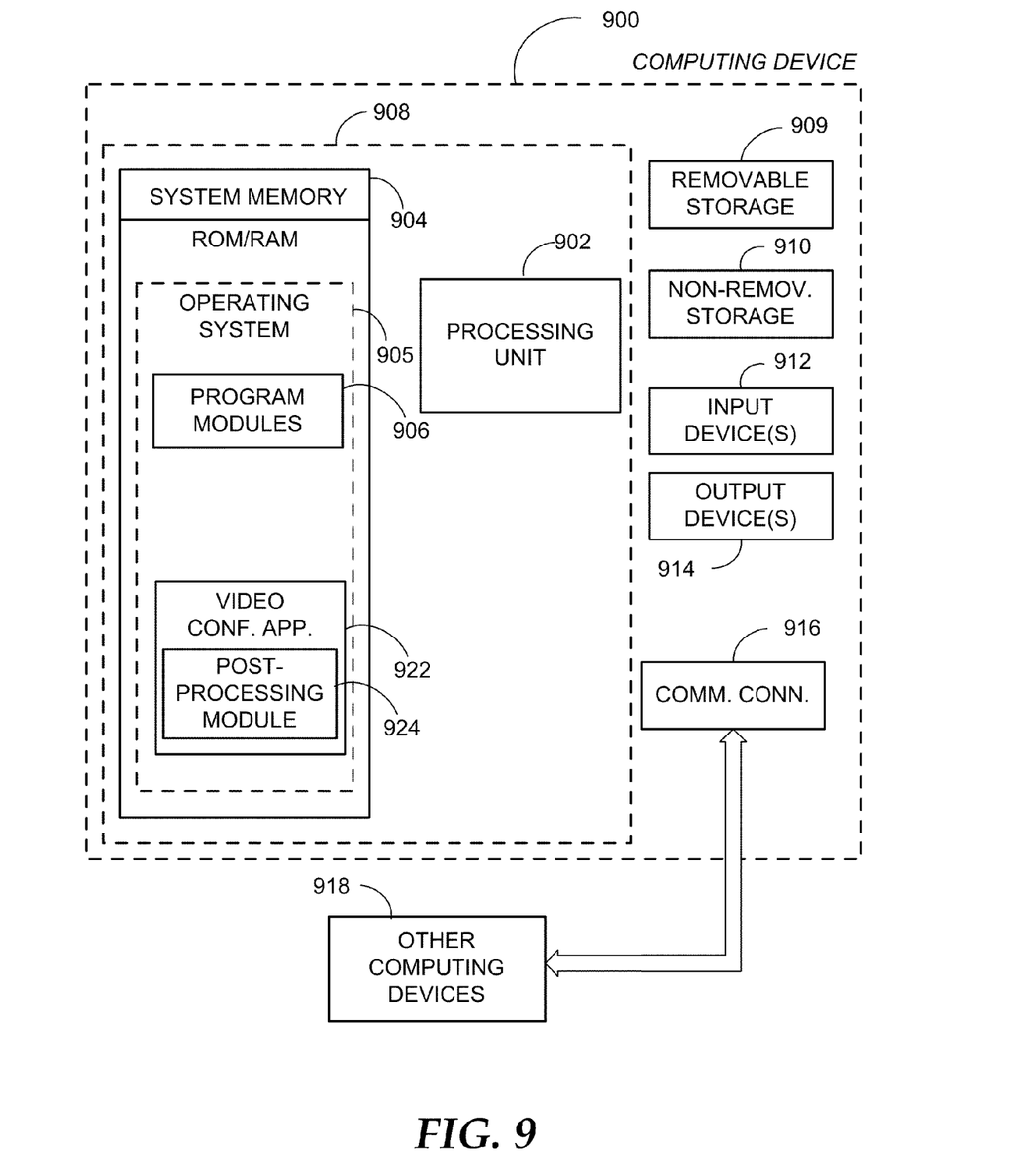
FIG. 9 is a block diagram of an example computing operating environment, where a communication application according to embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computer 900. In a basic configuration, computer 900 may include at least one processing unit 902 and system memory 904. Computer 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS® operating systems from MICROSOFT CORPORATION of Redmond, Wash. The system memory 904 may also include one or more software applications such as program modules 906, video conferencing application 922, and post-processing module 924.

Video conferencing application 922 and post-processing module 924 may be separate applications or integral modules of a hosted service that provides video conferencing services to client applications/devices. Video conferencing application 922 may transmit and receive video conferencing data including video and audio streams to other participants in the conference. Post-processing module 924 may, among other things, compute a blockiness metric to be used in enhancing received video quality as discussed in more detail above. This basic configuration is illustrated in FIG. 9 by those components within dashed line 908.

Computer 900 may have additional features or functionality. For example, the computer 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 900. Any such computer readable storage media may be part of computer 900. Computer 900 may also have input device(s) 912 such as keyboard, mouse, pen, voice input device, touch input device, and comparable input devices. Output device(s) 914 such as a display, speakers, printer, and other types of output devices may also be included. An interactive display may act both as an input device and output device. These devices are well known in the art and need not be discussed at length here.

Computer 900 may also contain communication connections 916 that allow the device to communicate with other devices 918, such as over a wireless network in a distributed computing environment, a satellite link, a cellular link, and comparable mechanisms. Other devices 918 may include computer device(s) that execute communication applications such as video conferencing applications and so on. Communication connection(s) 916 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
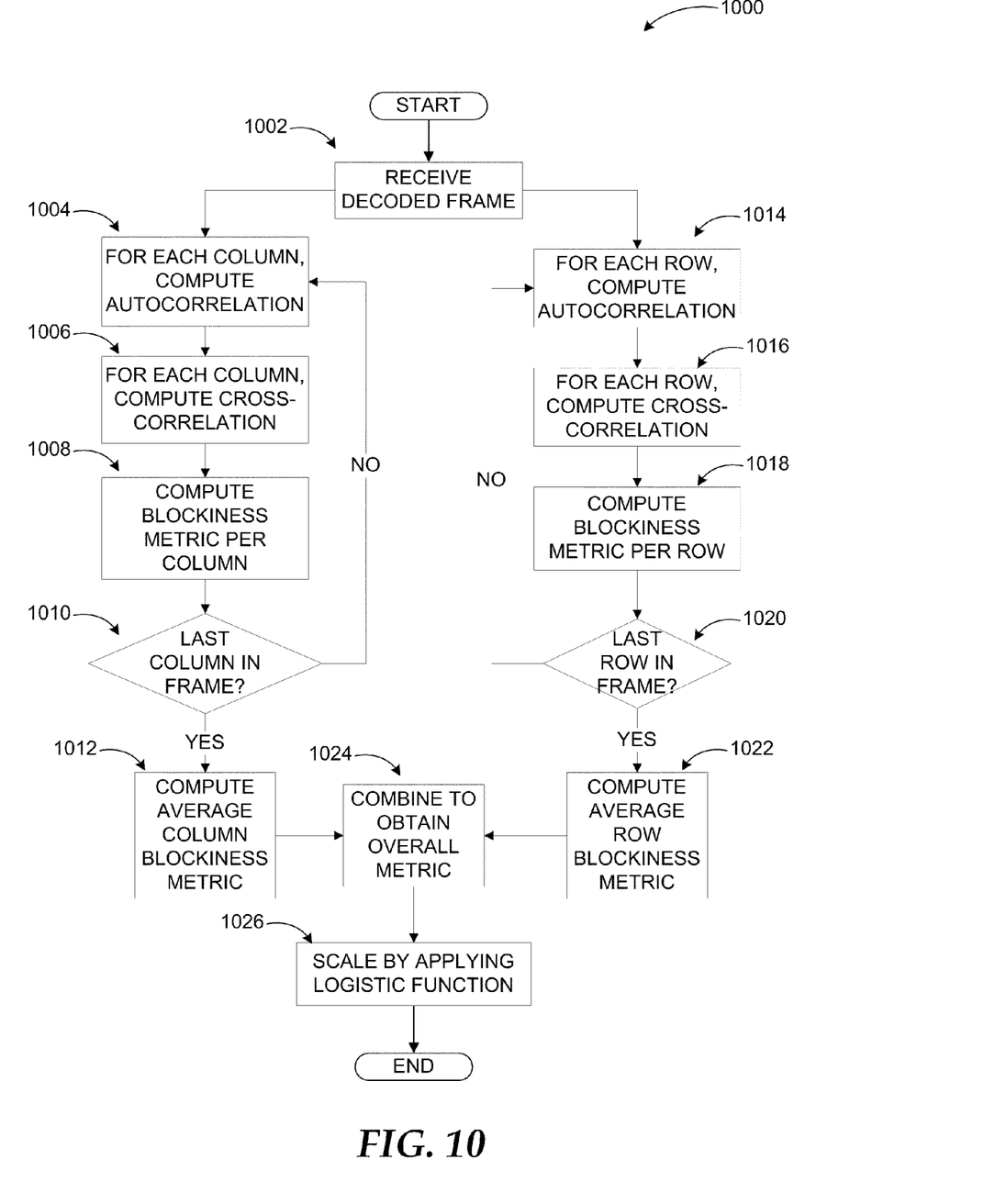
FIG. 10 illustrates a logic flow diagram for a process of determining a blockiness metric according to embodiments.

FIG. 10 illustrates a logic flow diagram for a process 1000 of determining a blockiness metric according to embodiments. Process 1000 may be implemented by any video conferencing application such as the ones described above.

Process 1000 begins with operation 1002, where a decoded frame is received at the post-processing stage. Two sets of parallel operations are initiated at this point. In operations 1004 through 1008 the autocorrelation and cross-correlation of each column are computed and combined into a column blockiness metric, respectively, until the last column in the frame is determined at decision operation 1010. Similarly, the autocorrelation and cross-correlation of each row are computed and combined into a row blockiness metric in respective operations 1014 through 1018 until the last row in the frame is determined at decision operation 1020.

Average column and row blockiness metrics are computed at operations 1012 and 1022 upon completion of per row and per column computations. This is followed by the combination of the average row and column metrics into an overall blockiness metric at operation 1024. Then, the overall blockiness metric is scaled by applying a logistic function to replicate Human Visual System. The scaled metric may be used to adjust operational parameters of the video conference system to enhance video quality for blockiness or to enhance overall video quality in combination with other metrics such as a sharpness metric or a ringing metric.

The operations included in process 1000 are for illustration purposes. Providing a blockiness metric in video conferencing applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a blockiness metric associated with received video quality in a video conference system, the method comprising:
    receiving a decoded video frame at a post-processing module;
    computing a blockiness metric for columns of the decoded video frame based on an autocorrelation value and a cross-correlation value of each column;
    computing a blockiness metric for rows of the decoded video frame based on an autocorrelation and a cross-correlation of each row; and
    combining the blockiness metric for the columns and the blockiness metric for the rows to obtain an overall blockiness metric for the decoded video frame.

2. The method of claim 1, further comprising:
    scaling the overall blockiness metric by applying a non-linear logistic function to replicate a behavior of Human Visual System (HSV).

3. The method of claim 2, wherein the logistic function is based on an exponential model.

4. The method of claim 2, wherein applying the logistic function comprises:
    determining a maximum overall blockiness metric among a predefined number of decoded video frames;
    determining an exponential model based on the determined maximum overall blockiness metric; and
    applying the exponential model to the overall blockiness metrics of the predefined number of decoded video frames such that the overall blockiness metrics have defined lower and upper limits.

5. The method of claim 2, further comprising:
    employing the overall blockiness metric to adjust at least one operational parameter of the video conference system for automatically reducing blockiness artifacts in received video.

6. The method of claim 2, further comprising:
    combining the overall blockiness metric with at least one from a set of: a sharpness metric, a jerkiness metric, and a dropped frame number to adjust at least one operational parameter of the video conference system for automatically enhancing received video quality.

7. The method of claim 6, wherein the at least one operational parameter is adjusted at one of: a pre-processing module, an encoder, a decoder, and the post-processing module of the video conference system.

8. The method of claim 1, wherein the blockiness metric for the columns and the blockiness metric for the rows are averaged prior to being combined to obtain the overall blockiness metric for the decoded video frame.

9. The method of claim 1, wherein the blockiness metric for the columns and the blockiness metric for the rows are computed using a ratio of the autocorrelation and cross-correlation of the corresponding columns and rows such that the overall blockiness metric for the decoded video frame is inverse proportional to a perceivable appearance of blockiness artifacts.

10. The method of claim 1, wherein the overall blockiness metric for the decoded video frame is further computed by determining and combining blockiness metrics for Y, U, and V planes of the decoded video frame.

11. The method of claim 10, wherein the blockiness metrics for Y, U, and V planes of the decoded video frame are combined through averaging employing a weighting factor of ½ for the Y plane, a weighting factor of ¼ for the U plane, and a weighting factor of ¼ for the V plane.

12. A computing device capable of providing video conferencing services, the computing device comprising:
   a video capture device;
   a pre-processing module;
   an encoder;
   a decoder;
   a post-processing module configured to:
      receive a decoded video frame;
      compute a blockiness metric for columns of the decoded video frame based on averaging autocorrelation and cross-correlation values of each column;
      compute a blockiness metric for rows of the decoded video frame based on averaging autocorrelation and cross-correlation values of each row;
      combine the blockiness metrics for the columns and the rows to obtain an overall blockiness metric for the decoded video frame; and
      scale the overall blockiness metric by applying a non-linear logistic function to replicate a behavior of Human Visual System (HSV), wherein the scaled overall blockiness metric is used to adjust at least one operational parameter of the video conference system for automatically enhance received video; and
   a display device for displaying the enhanced video.

13. The computing device of claim 12, wherein the post-processing module is further configured to:
   compute the blockiness metrics for the columns and the rows by determining a ratio of the autocorrelation and the cross-correlation values of each column and row, respectively;
   compute the overall blockiness metric for Y, U, and V planes of the decoded video frame; and
   combine the overall blockiness metrics of the Y, U, and V planes by weighting them with ½, ¼, and ¼, respectively.

14. The computing device of claim 12, wherein the overall blockiness metric is employed to perform one of:
   instruct the encoder to increase a transmit bit rate in response to the metric being below a predefined threshold; and
   instruct the post-processing module to increase a filtering strength in response to the metric being below the predefined threshold.

15. The computing device of claim 12, wherein a Multi-point Control Unit (MCU) of the video conference system is employed to receive the overall blockiness metric from a receiving participant and instruct a transmitting participant to adjust the at least one operational parameter for enhancing the received video.

16. The computing device of claim 12, wherein at least one from a set of: the pre-processing module, the encoder, the decoder, and the post-processing module are implemented as part of a processor configured to compute the overall blockiness metric.

17. A computer-readable memory device having instructions stored thereon for providing video conferencing services, the instructions comprising:
   receiving a decoded video frame at a post-processing module;
   computing a blockiness metric for columns of the decoded video frame based on averaging a ratio of autocorrelation and cross-correlation values of each column;
   computing a blockiness metric for rows of the decoded video frame based on averaging a ratio of autocorrelation and cross-correlation values of each row;
   combining the blockiness metric for the columns and the blockiness metric for the rows to obtain overall blockiness metrics for Y, U, and V planes of the decoded video frame;
   combining the overall blockiness metrics for Y, U, and V planes of the decoded video frame in a weighted manner;
   scaling the overall blockiness metric by:
      determining a maximum overall blockiness metric among a predefined number of decoded video frames;
      determining an exponential model based on the determined maximum overall blockiness metric; and
      applying the exponential model to the overall blockiness metrics of the predefined number of decoded video frames such that the overall blockiness metrics have defined lower and upper limits.

18. The computer-readable memory device of claim 17, wherein the scaled overall blockiness metric is computed as:

$$B_{scaled}(i) = c \frac{E(i)}{E_{max}},$$

where "i" is a frame number, E(i) is the exponential model defined as:

$$E(i) = \exp\left(\frac{8 * B(i)}{B_{max}}\right),$$

and $E_{max} = \max_i[E_1, E_2, E_3, \ldots E_N]$ with "c" determining the upper limit for the scaled overall blockiness metric.

19. The computer-readable memory device of claim 17, wherein the blockiness metrics for each of the columns and the rows are determined by B=1−A/C with A representing the autocorrelation values and C representing the cross-correlation values for respective columns and rows.

20. The computer-readable memory device of claim 17, wherein the instructions further comprise:
   combining the scaled overall blockiness metric with at least one from a set of a sharpness metric, a jerkiness metric, and a dropped frame number to obtain an overall video quality metric; and
   employing the overall video quality metric in automatically adjusting at least one operational parameter of a video conference system providing the video conferencing services for enhancing video quality.

* * * * *